F. K. HURXTHAL.
BEARING FOR GRAIN DRILLS AND THE LIKE.
APPLICATION FILED APR. 13, 1916.
1,215,811.                                      Patented Feb. 13, 1917.
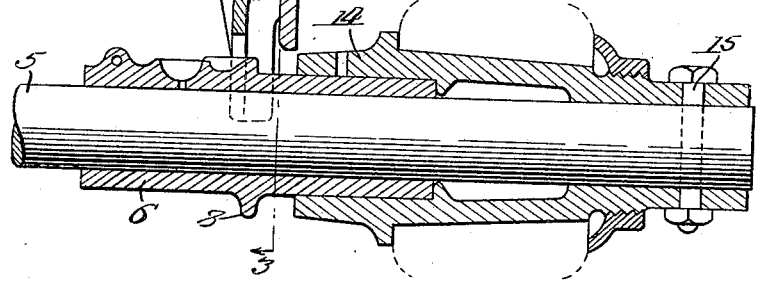
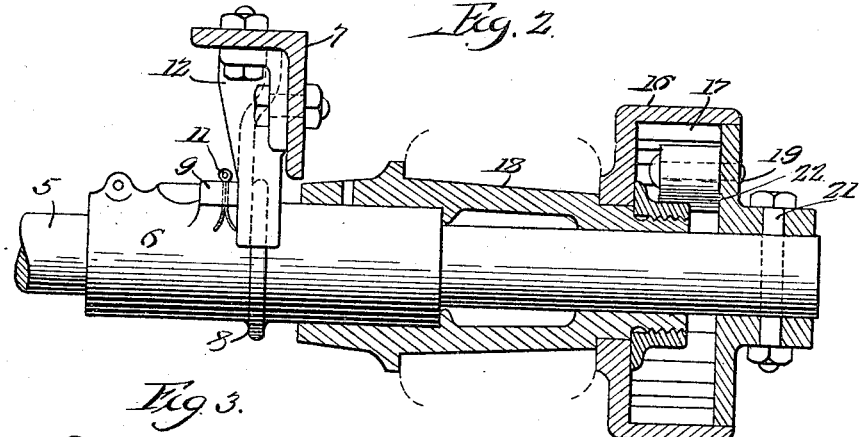
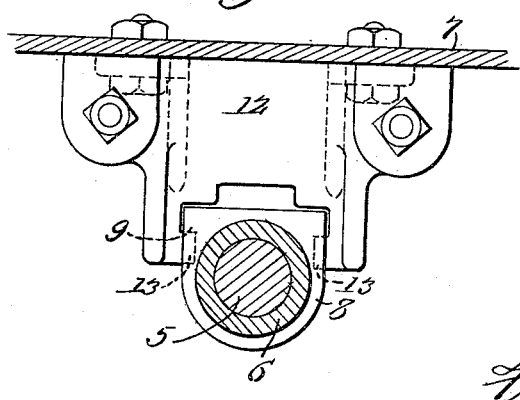
Inventor:
Frederick K. Hurxthal
By Pond & Wilson
Attys.

UNITED STATES PATENT OFFICE.

FREDERICK K. HURXTHAL, OF ROCKFORD, ILLINOIS, ASSIGNOR TO EMERSON-BRANTINGHAM COMPANY, OF ROCKFORD, ILLINOIS, A CORPORATION OF ILLINOIS.

BEARING FOR GRAIN-DRILLS AND THE LIKE.

1,215,811.   Specification of Letters Patent.   Patented Feb. 13, 1917.

Application filed April 13, 1916. Serial No. 90,942.

*To all whom it may concern:*

Be it known that I, FREDERICK K. HURXTHAL, a citizen of the United States, residing at Rockford, in the county of Winnebago and State of Illinois, have invented certain new and useful Improvements in Bearings for Grain-Drills and the like, of which the following is a specification.

This invention relates in general to bearings, but has more particular reference to the bearings for the carrying or supporting wheels of grain drills and similar machines.

In machines of this character the supporting or carrying wheels are mounted upon the ends of a shaft or shafts projecting laterally beyond the machine frame, the seeding mechanism being operated from these shafts which are rotated by the carrying wheels. In order to support the machine frame and seeding mechanism loosely upon the carrying and driving shafts it has been customary prior to my invention to flexibly attach the machine frame to sleeves disposed adjacent to the inner ends of the carrying wheel hubs, the driving and supporting shaft being journaled to rotate in said sleeves. These sleeves, however, were comparatively short and because of their loose connection with the machine frame considerable swinging and swaying of the carrying wheels relatively to the machine frame was permitted. This undesirable movement of the wheels was further increased, after the machine had been in use some time, by wear between the shaft and the bearing sleeve, and also by wear between the shaft and the carrying wheels.

One of the primary objects of my present invention is to provide a bearing for machines of this character which will permit of the desired flexibility between the carrying shaft and the machine frame, but will afford a long, strong, rigid and durable bearing for the carrying wheel hubs.

For the purpose of facilitating an understanding of my invention I have illustrated on the accompanying drawings fragmentary views showing preferred embodiments of the invention and its application to a grain drill.

Referring to the drawings—

Figure 1 is a longitudinal sectional view through a bearing embodying my invention;

Fig. 2 is a similar view showing a different form of connection between the wheel hub and the shaft, and Fig. 3 is a sectional view on the line 3—3 of Fig. 1.

On the drawings reference character 5 indicates the main supporting and driving shaft for a grain drill. In some types of drills this shaft extends entirely across the machine while in others two shafts are employed, each extending substantially to the center of the machine from opposite sides. The seeding mechanism is connected to and operated by this shaft or shafts, as the case may be, in a well known manner. A bearing sleeve, designated generally by reference character 6, is mounted upon the shaft one on each side of the machine and directly beneath each side member 7 of the machine frame. The outside of the bearing sleeve substantially midway between its ends is provided with a circumferential rib or flange 8 and on the inner side of the rib the top of the bearing is flattened and shaped to provide an overhanging ledge 9 perforated to receive a cotter pin or similar holding device 11. A bracket 12 securely bolted to the frame member 7 is shaped to straddle the upper portion of the bearing sleeve as shown in Fig. 3 and is provided with opposed inwardly extending lugs 13 which engage beneath the ledges 9 and prevent vertical disengagement of the bracket from the sleeve. In assembling the construction the sleeve is slipped into position beneath the frame from the outer end of the shaft until the rib 8 bears against the lugs 13. The cotter pin 11 is then inserted as shown in Fig. 2 so that the bearing sleeve is held against longitudinal movement on the shaft and relatively to the frame.

Prior to my present invention the bearing sleeve 6 terminated at the inner end of the wheel hub and sometimes it was provided with a flange which projected over the inner end of the hub for the purpose of excluding sand and dirt from the bearing. The wheel hub however, was mounted directly upon and supported only the shaft extending through the sleeve, and because of the loose connection between the sleeve and the frame above described, considerable latitude of movement of the wheel relatively to the frame was permitted.

Instead of mounting the carrying wheel hub solely upon the shaft 5 my present invention contemplates an elongation of the bearing sleeve 6 and a hardening of its outer end so that its periphery will provide a durable wearing surface. The wheel hub 14 is shaped at its outer end to snugly embrace the shaft but at its inner end it is enlarged so as to fit over the hardened outer end of the bearing sleeve. This construction provides a long bearing for the wheel hub, also a bearing of larger diameter at its inner end, and furthermore, since the hub snugly fits the shaft at one end and the bearing sleeve at its other the parts are firmly and durably connected together so that sidewise movement of the carrying wheels is prevented. It will be manifest also that because of the increased length of the bearing sleeve a longer bearing surface is provided in the sleeve for the rotating shaft 5, consequently, greater strength and durability is afforded.

When two shafts are employed, one wheel being mounted on each shaft, the wheel hubs are rigidly secured to the shafts at their outer ends by the bolts 15, as shown in Fig. 1. When, however, only one shaft is employed which extends entirely through the machine one of the wheels must be loosely mounted on the shaft so that one wheel may revolve faster than the other when the machine is turned around. In this case instead of bolting both wheel hubs to the shaft, I prefer to employ a construction such as shown in Fig. 2 in which a collar and housing 16 provided with internal ratchet teeth 17 is rigidly attached to one wheel hub 18, and driving connection between the wheel hub and shaft 5 is provided by securing a member 19 by a bolt 21 to the end of the shaft and mounting a pawl 22 of well known construction upon the member 19 so that it will engage with the teeth 17 when the wheel is rotated forwardly, but will permit relative backward rotation of the wheel with respect to the shaft.

It is believed that my invention and the advantages resulting from a long bearing sleeve extending into the wheel hub and forming a bearing for the inner end of the hub will be understood and appreciated from the foregoing without further description, and it should furthermore be obvious that the size, shape and proportion of the various structural details illustrated and described are capable of considerable modification and variation within the scope of the following claim:

I claim:

The combination of a rotatable shaft, a bearing sleeve in which said shaft is rotatably mounted, the periphery of the outer end of said sleeve being hardened to provide a durable wearing surface and said sleeve being positioned on the shaft remote from the end thereof, a wheel hub shaped at its inner end to rotatably fit the hardened end of said sleeve and shaped at its outer end to snugly fit the projecting end of said shaft, whereby said sleeve is partially supported directly by said hub and partially supported indirectly by said hub through the intermediary of said shaft, and a driving connection between said wheel and said shaft.

FREDERICK K. HURXTHAL.

Copies of this patent may be obtained for five cents each, by addressing the "Commissioner of Patents, Washington, D. C."